March 20, 1934.   G. A. LYON   1,951,801
METHOD OF AND APPARATUS FOR FORMING AND FINISHING TIRE COVER RIMS
Filed Nov. 5, 1931   13 Sheets-Sheet 1

Inventor
George Albert Lyon.
by Charles W. Hills Attys.

March 20, 1934.   G. A. LYON   1,951,801
METHOD OF AND APPARATUS FOR FORMING AND FINISHING TIRE COVER RIMS
Filed Nov. 5, 1931   13 Sheets-Sheet 7

March 20, 1934. G. A. LYON 1,951,801
METHOD OF AND APPARATUS FOR FORMING AND FINISHING TIRE COVER RIMS
Filed Nov. 5, 1931 13 Sheets-Sheet 11

Inventor
George Albert Lyon.
by Charles H. Hills Atty.

March 20, 1934.    G. A. LYON    1,951,801
METHOD OF AND APPARATUS FOR FORMING AND FINISHING TIRE COVER RIMS
Filed Nov. 5, 1931    13 Sheets-Sheet 13

Patented Mar. 20, 1934

1,951,801

UNITED STATES PATENT OFFICE 1,951,801

METHOD OF AND APPARATUS FOR FORMING AND FINISHING TIRE COVER RIMS

George Albert Lyon, Allenhurst, N. J., assignor to Lyon Incorporated, Detroit, Mich., a corporation of Delaware Application November 5, 1931, Serial No. 573,198

20 Claims. (Cl. 29—33)

This invention has to do with tire covers of the type which embodies a split resilient rim member for embracing the tread of a tire, and is particularly concerned with a method and apparatus for forming, finishing and cutting such rims.

This invention is an improvement on the invention set forth and claimed in my copending application entitled Method of and apparatus for forming and cutting tire cover rims, filed November 5, 1931, Serial No. 573,197, and not only is capable of performing substantially all the functions of the invention of my said copending application, but in addition to those functions and objects, also has the objects hereinafter apparent.

In the manufacture of rims for tire covers of the described character, it is the usual practice to feed a continuous strip of meal into a plurality of forming rolls which are so designed that a predetermined transverse longitudinal curvature is imparted to the strip so that the strip, when it emerges from the rolls, will be in the form of a helix. This helical strip is then carried to a cutter which cuts the strip into predetermined lengths, thereby producing resilient split rings. These rings, which are in the unfinished state, as a general rule will have roll marks on their surface and, if any dust or foreign matter should be on the strip while it is passing through the rolls, streaks will be formed on the surface of the strip. These streaks and roll marks are very difficult, if not impossible, to remove by burnishing and polishing.

After the helical strip is cut into split rings of the desired size, the rings are then transported to the buffing and polishing department, where they are manually fed into power-operated buffing and polishing machines, whereby the outer surface of each ring is finished. In other cases, the ring may be plated in order to obtain the desired finish. In either case, it has been found to be very difficult to obtain a finish which is free from imperfections on account of the roll marks and streaks which are left in the surface of the ring as a result of the forming operation. Moreover, the split rings are inconvenient to handle and there is consequently a likelihood that additional scratches and marks will be made in the surface of the ring during its transportation to the buffing and polishing department and during the polishing and buffing operations. Also, since these operations depend largely upon the human factor, one portion of the ring surface may be polished and buffed a greater length of time than another portion of the surface, the result being that the finished surface will have dark spots or portions which obviously detract from the appearance of the finished ring.

The foregoing procedure is therefore objectionable in that it is very difficult to obtain a ring having the desired surface finish, and, moreover, the cost of manufacture is increased by virtue of the large number of rings which are rejected during inspection, and which are sent back to receive additional polishing and buffing.

To overcome these and other objections to the present method of manufacturing tire cover rims of the character described, it is a primary object of this invention to provide a machine wherein dust and foreign matter will be removed from the strip of stock material before it passes through the forming rolls, thereby enabling the forming operation to be carried out without producing streaks and marks on the surface of the strip.

A further object of the invention resides in the provision of a machine for producing a finished tire cover rim, wherein a flat strip of material is passed through forming instrumentalities to give it a predetermined shape, and in which the strip is burnished and polished before it is cut into rims of the desired size.

It is another object of this invention to provide in a machine for producing finished tire cover rims, means whereby dust and foreign matter is removed from the strip as it enters the machine and wherein additional dust and foreign matter are prevented from accumulating on the strip as it progresses through the machine.

It is also an object of the present invention to provide in a machine for producing finished tire cover rims, novel means for burnishing the strip simultaneously with its formation into a predetermined shape.

In accordance with the general features of this invention, it is proposed to provide a plurality of metal rolling elements arranged in tandem and driven from a suitable source of power, each set of elements performing its individual operation on the strip of stock until the desired transverse and longitudinal shape is imparted to the originally flat stock. Provision is made to cause the metal to flow in from the center of the stock to in such a manner as to determine the longitudinal curvature of the finished strip. As the strip emerges from the last set of rolls, it is guided over a shoe which forms a sector of a helix, this shoe being adjustable in curvature so that the strip will form a helix having a diameter which is substantially that of the finished rim. The polishing operation is accomplished by means of a plurality of polishing wheels which engage the outer surface of the strip as it passes over the aforementioned shoe. After being polished the helical strip is conducted to a cutting or shearing device by means of which the strip is cut into suitable lengths for use as tire cover rims.

Another feature of the invention resides in the manner in which burnishing of the strip is accomplished before the polishing operation takes place. For this purpose, means are provided for rotating the final set of forming rolls at such a speed that the peripheral surface speed is greater than the speed at which the strip is moving as it emerges from the rolls prior to the final rolls.

By virtue of the difference in speed between the surface of the last set of rolls and that of the strip, the surface the last set of rolls will be caused to slip relative to the strip. This slippage results in the strip being burnished.

Still another feature of the invention resides in the means for cleaning the strip as it enters the machine and the manner in which dust and foreign particles are prevented from accumulating on the strip as it passes through the rolls. For this purpose the strip is initially passed between a plurality of wiping pads of some such material as felt. In order to keep the surface of the strip clean during its passage through the rolls, I have provided a piping system and nozzles by means of which a fluid such as soapy water may be projected onto the strip. This fluid will carry off any dust particles or foreign matter which might otherwise tend to accumulate on the strip. Wiping pads are also associated with the rollers so that the surface thereof will at all times be clean and free from dust or foreign particles. A similar piping system is also provided for applying a polishing liquid to the strip while it is being polished.

Other objects and features of this invention will more fully appear from the following detail description taken in connection with the accompanying drawings which illustrate a single embodiment thereof, and in which

Figure 14 is an enlarged sectional view of the final set of rolls for burnishing the strip and imparting a longitudinal curvature thereto, and showing means for raising and lowering the lower roll of the set relative to the upper roll, taken substantially on line XIV—XIV of Figure 1;

As shown on the drawings:

In accordance with the illustrated embodiment of this invention, there is shown on the drawings a machine for producing from a flat strip of stock material finished tire cover rims, the machine in general comprising a mechanism as generally indicated at A for imparting a transverse curvature to the strip, a mechanism B for imparting the longitudinal curvature to the strip and forming the same into helical shape and at the same time burnishing the same, mechanism C for polishing the strip while in helical form, and mechanism as generally indicated at D for cutting or shearing the helical strip into predetermined lengths to produce a split ring.

More specifically, the machine or apparatus comprises a main base or platform 1 and pedestal 2, which cooperate to support a pair of spaced frame members 3 and 4 in which journals are provided for the shafts of co-operating metal rolling elements to be hereinafter more fully described. The mechanisms A and B are driven from a suitable source of power, such, for example, as an electric motor 5 having its shaft 6 connected to a main drive shaft 7 through a suitable speed reducing mechanism which may be in the form of a worm and gear as generally indicated at 8.

A ribbon or strip 9 of flat stock, which may be of metal such as stainless steel or other material, is fed into the machine over a roller 10 which is transversely supported for rotation upon a bracket 11 secured at its inner end to the frame members 3 and 4. Spaced guide rollers 12 are provided for initially aligning the entering strip which passes between a plurality of sets of wiping elements. Each set of wiping elements comprises a lower pad 13 which may be of felt or other suitable material and an upper pad 14, the latter of these pads being carried on a screw 15 which is in threaded engagement with a bracket 16 so that the upper pad may be moved towards and away from the lower pad by means of a hand wheel 17 to enable threading of the strip of stock material between the pads and to enable the pressure of the pads on the strip to be increased or decreased as desired. After passing through the wiping elements the strip passes between a pair of spaced lateral guides 18—18 which are arranged so that they may be adjusted to move the strip laterally to properly align the same as it enters the forming mechanism A. If desired, a final wiping element 19 may be provided, this element being substantially the same as those previously described.

Five sets of rolling elements are provided in accordance with the present invention, although it will be understood that this number may be increased or decreased as desired without departing from the principles of this invention. The first or initial set of rolls comprises an upper male element 20 and a cooperating female element 21, these elements having interfitting surfaces which are so formed that each edge of the strip is upwardly deflected as shown at 22 to form an angle of substantially 45°.

Figure 8:
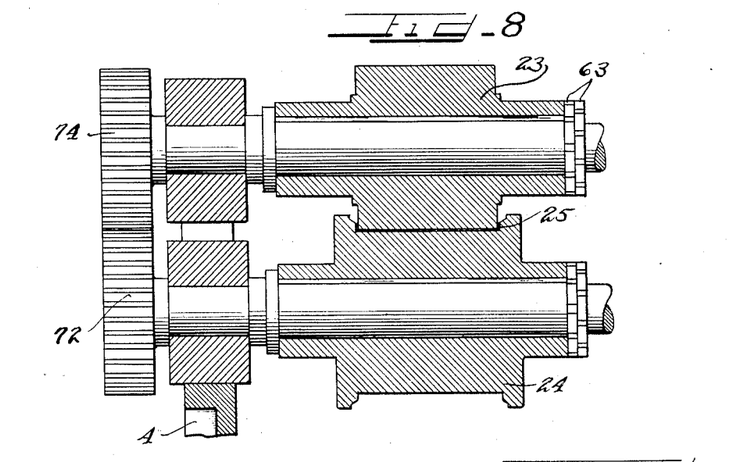
Figure 9:
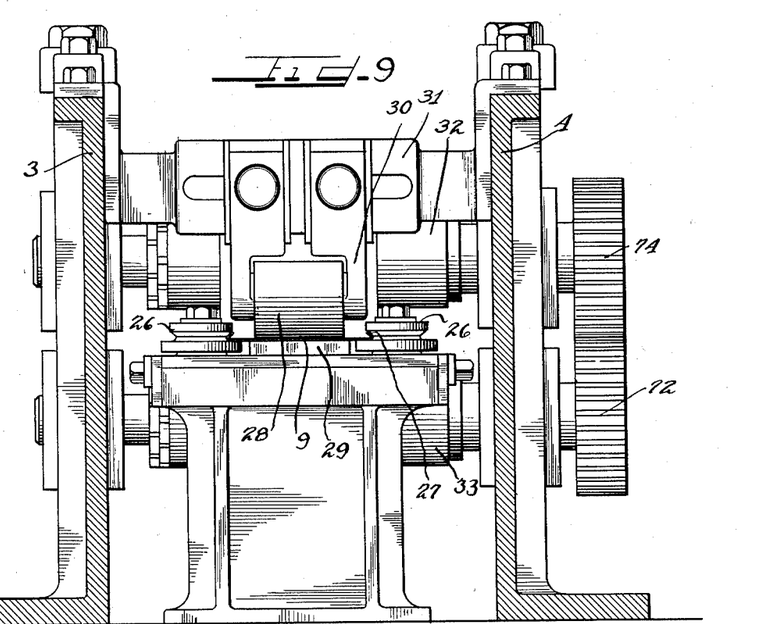
Figure 9 is an enlarged vertical section showing the strip-engaging idler roller disposed between the second and third sets of rolls, taken substantially on line IX—IX of Figure 3.

The second set of rolls comprises a male element 23 and a female element 24, as shown in Figure 8. These rolls are similar to the initial set of rolls except that their interfitting surfaces are so formed that the angularly disposed edge 22 is now deflected as shown at 25 to form a right angle flange along each edge of the strip. From the rolls 23 and 24 the strip 9 passes between a pair of spaced spinning wheels 26 which are free to rotate about their vertical axes and are provided with a peripheral groove for engaging the upstanding flange of the strip, this groove being so formed that the flange is spun inwardly into overlying relation to the body of the strip as indicated at 27. During this spinning operation, the strip 9 is held against deformation by a roller 28 which engages the upper surface of the strip and forces the strip against a rigidly mounted plate 29 which engages the lower surface thereof. This roller is supported for rotation about its horizontal axis upon a bracket 30 which is laterally and longitudinally adjustable relative to a transverse frame member 31 having its ends supported in the frame members 3 and 4.

Figure 10:
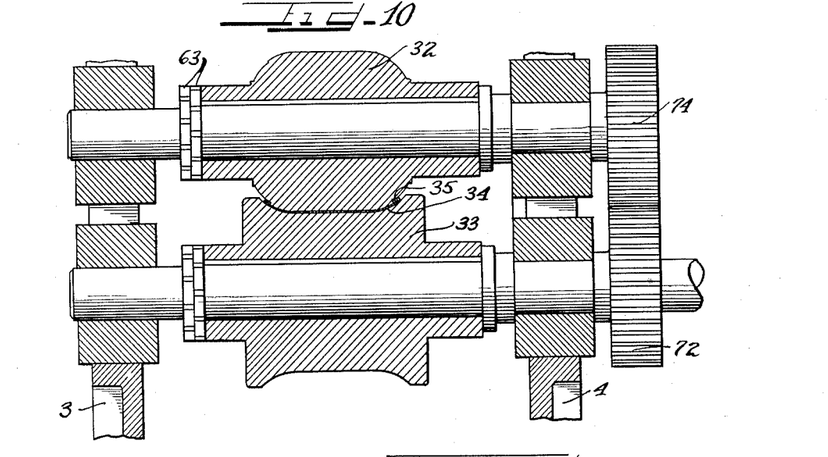
Figure 10 is an enlarged vertical sectional view through the third set of rolls, taken substantially on line X—X of Figure 1.

After the spinning operation, the strip 9 passes between the male and female members 32 and 33, respectively, of the third set of rolls, as shown in Figure 10. Up to this time it will be observed that the strip 9 has maintained its flat surface except for turning of the edges. The interfitting surfaces of the rolls 32 and 33 are so formed that as the strip passes therebetween the lateral margins are curved transversely as shown at 34 and the inwardly turned edges of the strip as shown at 27 are now flattened against the strip as shown at 35. The central portion of the strip, however, is still maintained flat.

Figure 12:
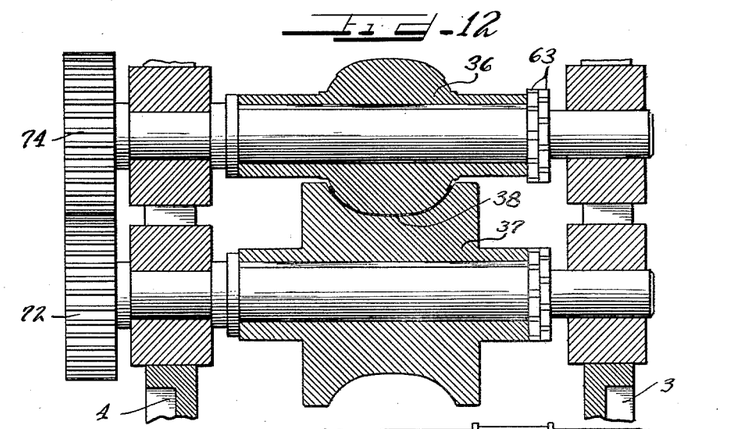
Figure 12 is an enlarged vertical section through the fourth set of rolls, taken substantially on line XII—XII of Figure 1.

The fourth set of rolls which comprises male and female members 36 and 37 respectively are provided with interfitting surfaces as shown in Figure 12, which impart a transverse curvature to the central flat portion of the strip as it issues from the third set of rolls, this curved portion being clearly indicated at 38.

The fifth or finishing set of rolls, as shown in Figure 14, comprises a male member 39 and a female member 40, these members having interfitting surfaces which are of the same general shape as the interfitting surfaces of rolls 36 and 37, respectively. These latter rolls, however, function merely to feed the strip in a straight line and operate to form the transverse curvature in the strip, whereas the rolls 39 and 40 function to impart a longitudinal curvature to the strip. The surfaces of the finishing rolls are therefore designed so that as the strip passes therebetween the central portion of the strip will be thinned and thereby lengthened with respect to the marginal portions, where the central portion is to constitute the outermost portion of the curved strip. It will be appreciated, of course, that only a slight difference in thickness of the portions is necessary in order to produce a substantial longitudinal curvature in the strip. It is therefore desirable to provide means for producing slight variations in the degree of thinning of the central portion of the strip, and for this purpose, the journals of the lower roll or female member 40 are provided with a lower beveled surface 41 for engaging a corresponding surface on a wedge member 42 which is arranged for longitudinal movement over a pad 43, mounted in the base 1, by means of an adjusting screw or bolt 44 which extends through the wedge member and threadedly engages one of the journals supporting the lower roll. A lock nut 45, when tightened, locks the wedge member in adjusted position. By virtue of this adjustment, the lower roll may be moved towards and away from the upper roll, which is fixedly supported in position, thus enabling the production of tire cover rims of different diameters.

The male and female members 39 and 40 of the finishing set of rolls are also used to burnish the strip as it passes therebetween. This is accomplished by rotating the finishing rolls at such a speed that the interfitting surfaces thereof will have a lineal velocity greater than the velocity at which the strip is being fed to the rolls. By virtue of this difference in speed, the rolls will slip relative to the surfaces of the strip with the result that this slippage causes the surfaces to become burnished and ready to receive the polishing operation. It will be appreciated that, in imparting a longitudinal curvature to the strip, the strip would tend to turn back upon the machine and possibly interfere with its operation. To meet this exigency, without harmful effects upon the finished product, a shoe 46 is provided at the exit side of the finishing rolls for guiding the strip away from the rolls. Transversely, this shoe is similar in configuration to the strip and the shoe is longitudinally formed as a sector of a helix. With this arrangement it will be appreciated that as the strip issues from the finishing rolls, it will be guided over the aforementioned shoe and will assume a helical form. In order to properly conduct the strip away from the operating parts of the machine, as well as to obviate any possibility of the strip's accidentally engaging said parts, a supporting rail 47 is provided. This rail may be of any desired length, but is preferably of such length as to enable the finished strip to coil about the same a number of times before it reaches the shearing mechanism D. Any suitable type of shearing mechanism may be employed and it is preferably so set up as to cut the finished strip into equal lengths, and is capable of adjustment to vary the length of the material to be cut. By making the rail 47 of sufficient length to accommodate a plurality of coils of the strip, it will be appreciated that where a manually controlled shearing apparatus is employed, should for any reason the operation thereof be slowed up, the feeding of the strip from the machine need not be interrupted inasmuch as the excess strip material will simply gather in coils about the rail 47.

The pitch of the helix of the finished strip is not such as to interfere with the positioning of the tire cover rim formed from each length of the strip upon the tread to be embraced thereby for the reason that the strip is of resilient material and has a normal diameter substantially less than the diameter of the tread of the tire to which it is to be applied.

Thus, while if suspended free, the cover rim ends are displaced laterally from each other by substantially the pitch of the helix above referred to, yet the degree of resilience of the material is such that the force required to bring the ends in alignment is almost negligible. Consequently the rim will tightly grip and embrace the tread of the tire to which it is applied without displaying any evidence whatever of its tendency when unstressed to assume a substantially helical shape.

Figure 11:
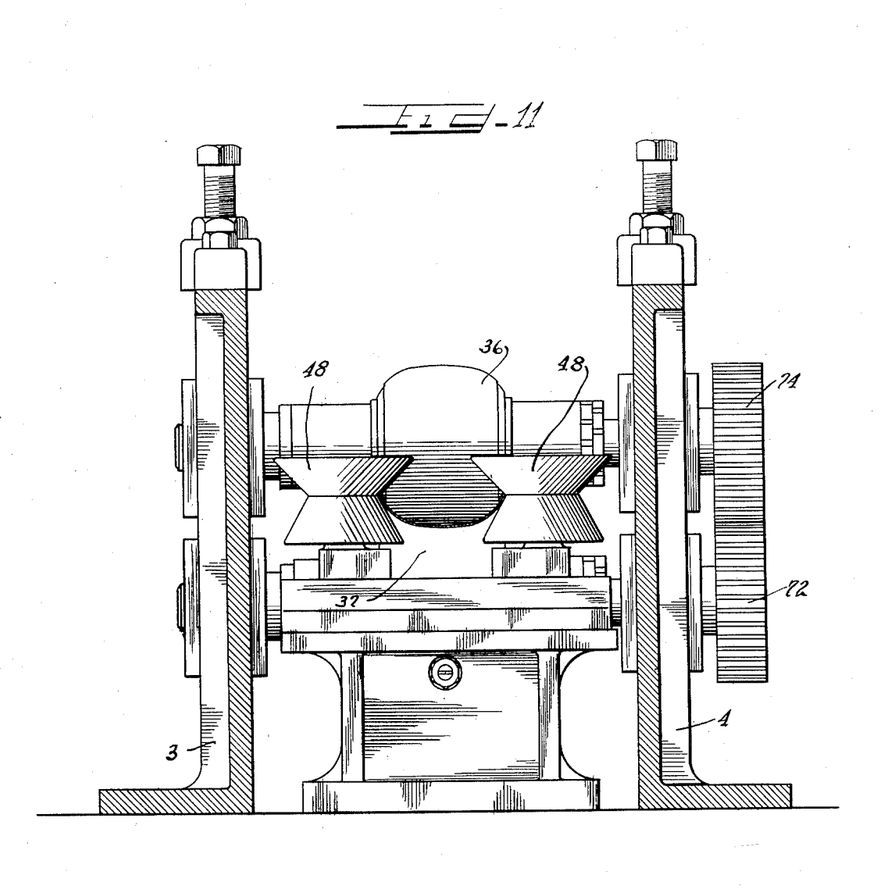
Figure 11 is a vertical sectional view showing lateral guide members for guiding the strip into the fourth set of rolls, taken substantially on line XI—XI of Figure 3.

As the strip passes through the various rolls, it will be appreciated that the over-all width of the strip will be changed due to the fact that the edges are turned up by certain of the sets of rolls and the formation of a transverse curvature in the strip. For this reason, it has been found advantageous to provide lateral guides at certain positions in the forming portion of the machine containing the rolls as will assure that the strip is held against lateral displacement. These guides are in the form of rotatable wheels or discs 48, as clearly shown in Figures 11, 13 and elsewhere, which are mounted with their axes of rotation vertical and are provided with a peripheral V-shaped groove for receiving an edge of the strip which is being formed. Each of these wheels is mounted upon a vertically disposed spindle 49 which may be bolted or otherwise secured to one of a plurality of transverse frame members 50 connecting the frame members 3 and 4.

Figure 13:
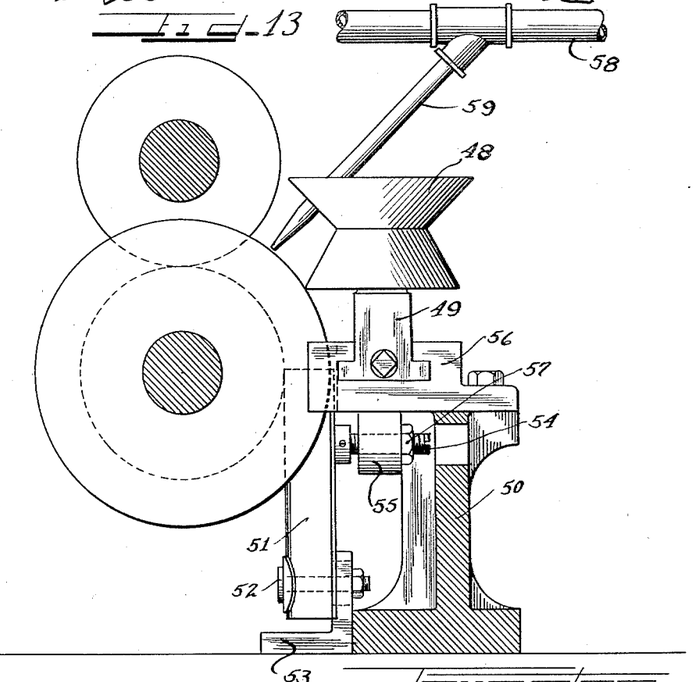
Figure 13 is an enlarged side elevation showing the mounting for the lateral guide members for the strip and means for adjusting the same.

Since this invention contemplates that the formed strip will be polished before it is cut into split rings, it is of the utmost importance that the strip shall be kept clean and free from dust and other foreign matter while it is being carried through the rolls. For this purpose, felt pads, as illustrated in Figure 13, may be secured adjacent the lower rolls, the lower end of the pads being anchored by suitable anchor means 52 to a bracket member 53, the upper end of the felt pads being in engagement with the surface of the lower roll which comes in contact with the strip as it passes through the rolls. Adjustment of the felt pad 51 to enable it to be moved more or less forcibly against the roll surface is accomplished by providing an adjusting screw 54 which threadedly engages a depending lug 55 on a plate 56 which is bolted or otherwise secured to the transverse frame member 50. The inner end of the screw 54 is connected to the free end of the pad 51 in such a manner that rotation of the screw will cause the pad to move towards and away from the roll surface, a lock nut 57 being provided for locking the screw 54 in adjusted position.

Cleaning of the strip and rolls is further augmented by spraying a fluid such as soapy water upon the strip and between the rolls. For this purpose, a supply pipe 58 is carried through the forming mechanism above the upper rolls and branch pipes 59 extend from the supply pipe and terminate at points above the strip adjacent the upper rolls which are to be supplied with fluid, the lower end of each branch pipe being shaped to form a nozzle. For supplying the liquid to the lower rolls, a supply pipe 60 is suitably supported along each side of the frame beneath the lower rolls and nozzles 61 form branch pipes having their ends terminating at such a point that the liquid will be projected against the under side of the strip as it passes through the rolls and between the rolls.

Lubrication of the finishing rolls and strip passing through the finishing rolls is obtained by conducting the fluid through a pipe 62 from a source of supply this pipe being connected in the upper end of the shoe 46 which is hollow so as to enable the fluid to flow therethrough and be discharged between the rolls and onto the strip. It will be appreciated that the liquid flowing through the hollow shoe 46 will also tend to cool this shoe, since the same will become heated due to the friction of the strip passing thereover and also to the polishing operation which will subsequently be described in more detail.

Each of the rolls employed in this machine is removably carried by a shaft, the ends of which are journalled in the side frames 3 and 4, and is suitably adjusted by a lock nut 63 or the like.

The lower finishing roll 40 has its shaft connected through a flexible coupling generally indicated at 64 to a shaft 65 having its other end connected through a similar flexible coupling 66 to the shaft 7 of the speed reducing worm gear. The flexible couplings 64 and 66 enable driving of the lower roll in its adjusted position relative to the upper roll 39, it being appreciated that there may be positions of the lower roll in which the shaft 65 will be disposed at an angle relative to the shaft of the roll and the shaft 7.

Figure 1:
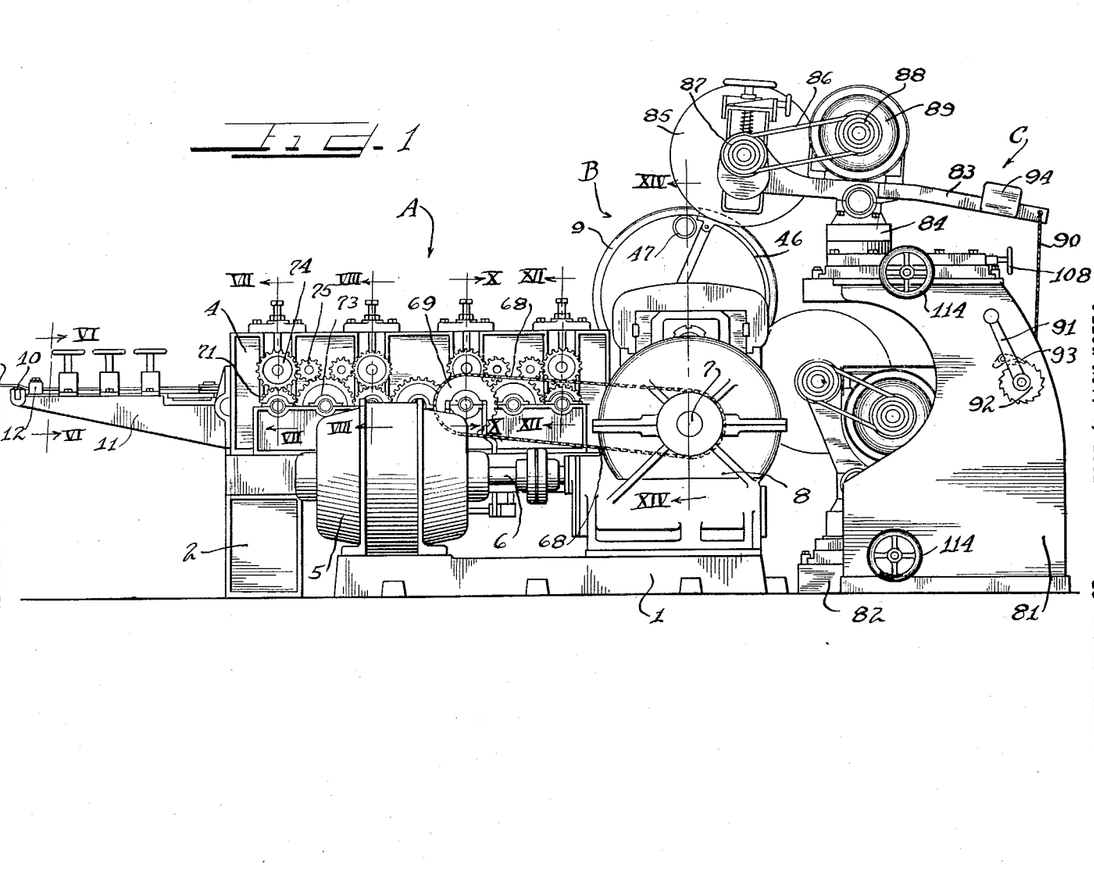
Figure 1 is a view in elevation of the drive side of a machine embodying the features of the present invention, and in addition showing a flat strip of metal stock entering the machine and the relationship of the polishing mechanism to the strip forming instrumentalities.
Figure 2:
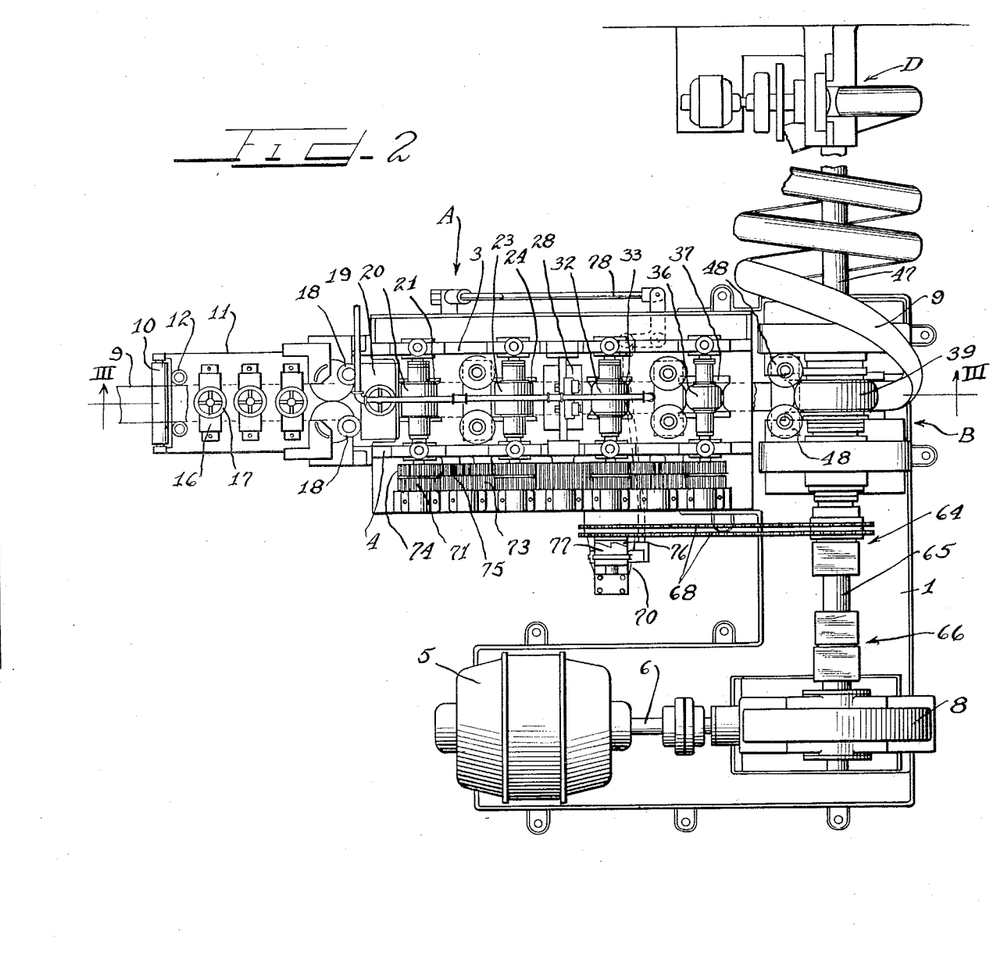
Figure 2 is a plan view of the same, the polishing mechanism being omitted, and showing shearing means for cutting the formed strips into predetermined lengths.
Figure 3:
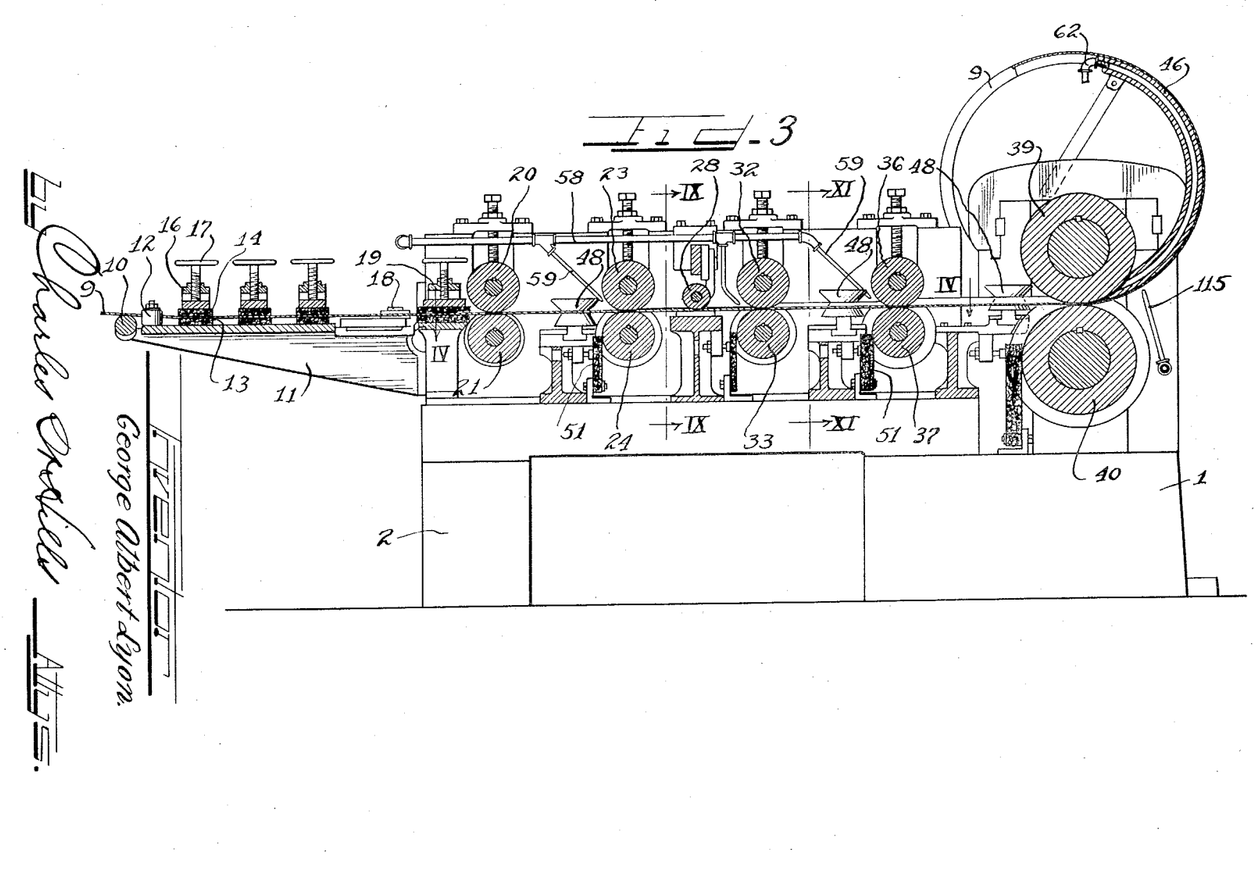
Figure 3 is a vertical sectional view through the portion of the machine for forming the strip, this view also showing the means for cleaning the strip as it passes through the rolls, taken substantially on line III—III of Figure 2.
Figure 4:
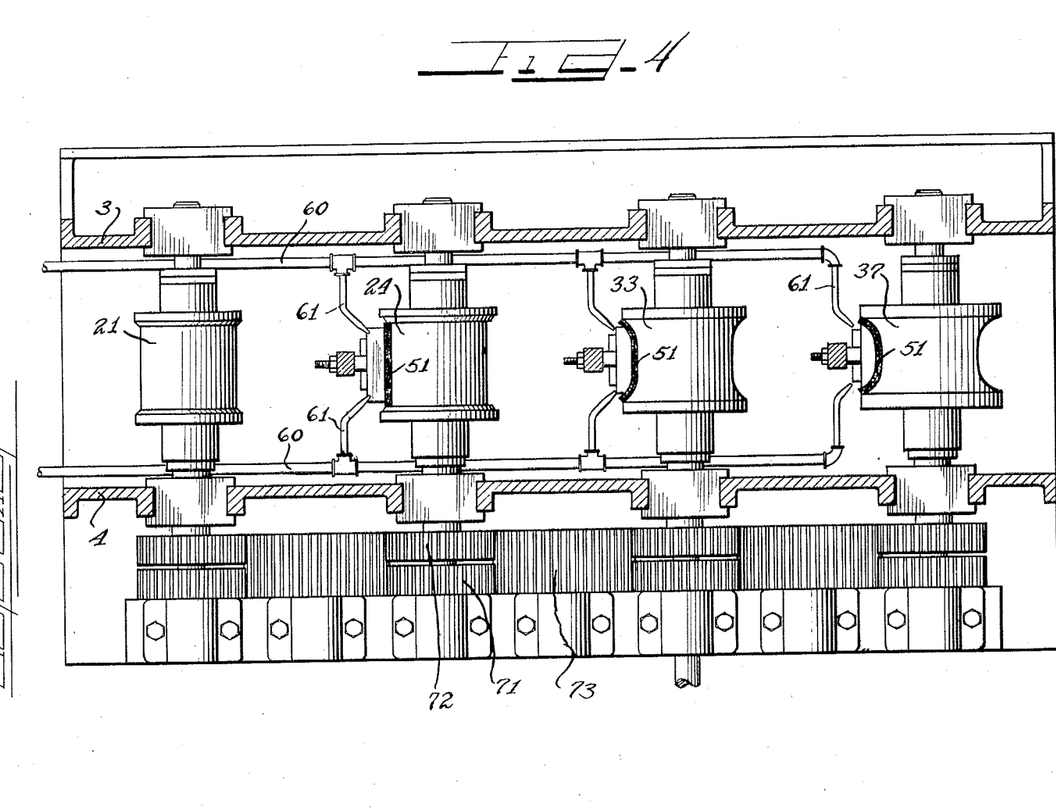
Figure 4 is an enlarged horizontal section through the strip forming portion of the machine to show the lower roll members, the manner in which the roll members are cleaned and means for supplying a liquid to the surface of the lower roll members, taken substantially on line IV—IV of Figure 3.
Figure 18:
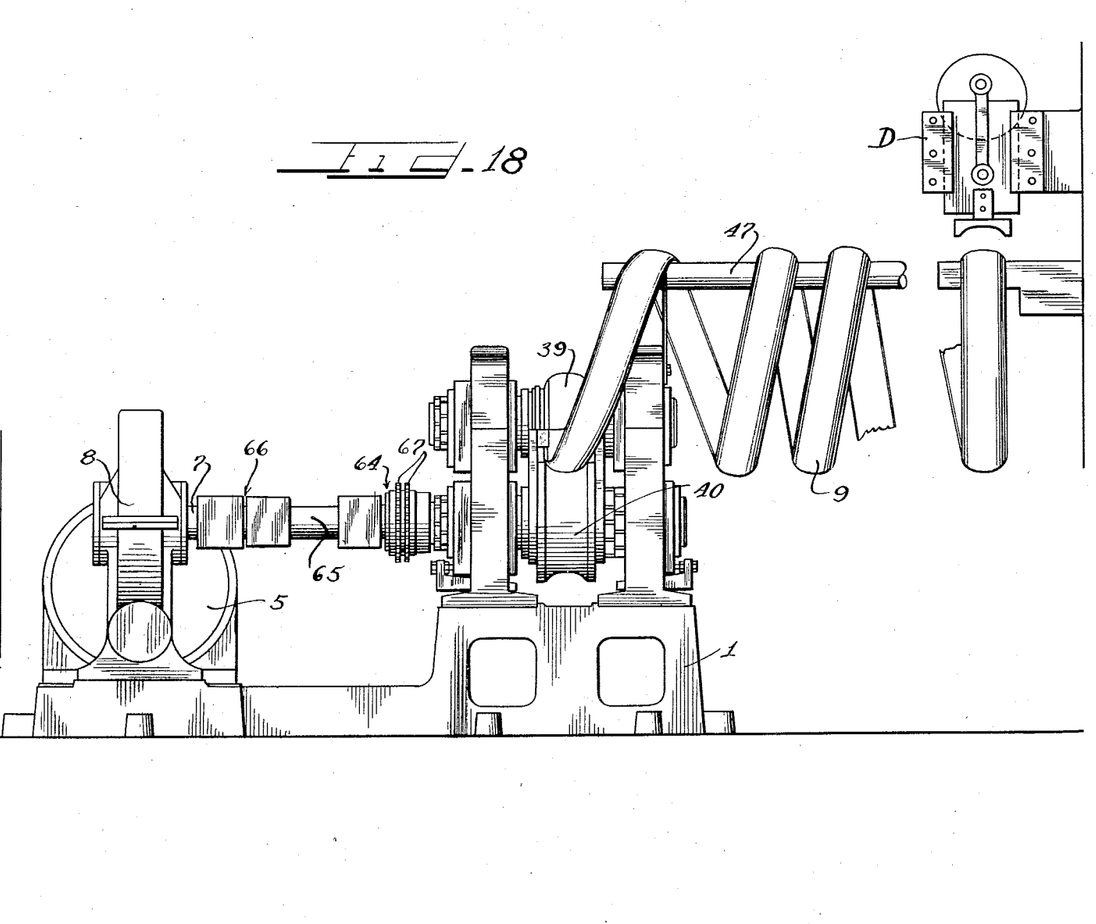
Figure 18 is a view in elevation looking toward the end of the machine from which the formed strip emerges, the polishing mechanism being omitted, and showing the device for shearing the finished strip into predetermined lengths.

The first four sets of rolls are driven from sprocket wheels 67 (Figure 18) which are carried by the shaft of the lower finishing roll 40, through chains 68 (Figures 1 and 2) which are trained over sprocket wheels 69 which are connectible through a clutch generally indicated at 70 to the shaft of the female roll element 23. The first four sets of rolls are driven by a system of gearing from the shaft of the roll 33. It is to be understood that any system of gearing which is suitable to rotate the rolls in the proper direction may be employed. However, in accordance with the illustrated form of the invention the shaft of each lower roll carries at one end a pair of gears 71 and 72, these gears of adjacent rolls meshing with a common idler gear 73 which is of sufficient width to extend across both gears 71 and 72. Power is transmitted from the lower roll of each set to the upper roll of the set through a gear 74 on the shaft of the upper roll, the gear 74 meshing with the gear 72 in each particular set of rolls. Power is also furnished to the upper roll of each set of rolls through a pinion 75 which meshes with the gear 74 and one of the idler gears 73.

The clutch 70 is of the usual construction and includes a driving member 76 which is actuated through the agency of the chains and sprockets 68 and 69 respectively, and a driven member 77 which is secured to the shaft to be driven and is movable axially of the shaft into and out of engagement with the drive member of the clutch by means of a system of levers generally indicated at 78. This clutch enables the driving power to be disconnected from the first four sets of rolls, in which case the strip of stock material is drawn into the machine by virtue of the finishing rolls 39 and 40. It will be appreciated, however, that when starting the strip through the machine it will be necessary to drive the first four sets of rolls so that the strip will be carried to the finishing rolls.

Figure 5:
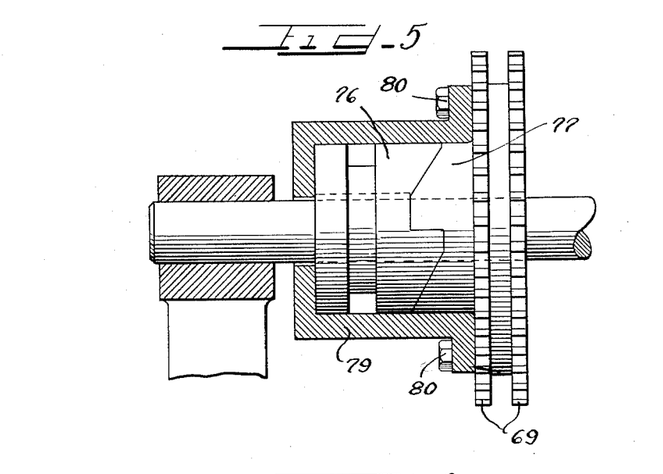
Figure 5 is an enlarged fragmentary sectional view of a modified clutch mechanism in the drive for all of the sets of rolls except the final set of rolls.
Figure 6:
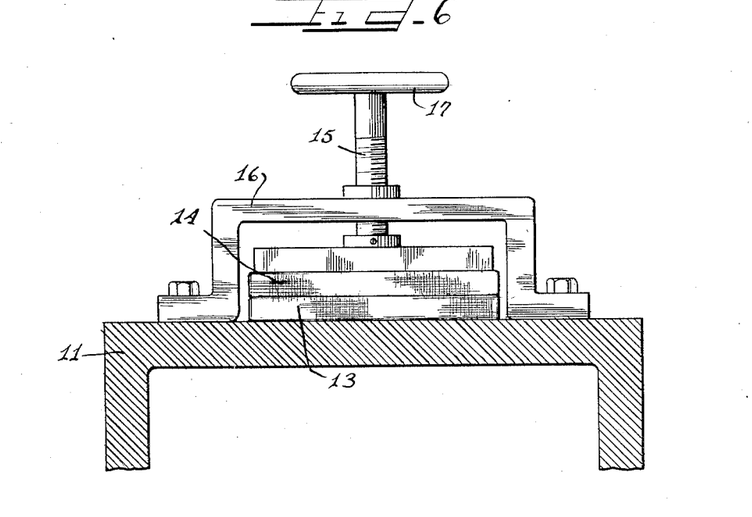
Figure 6 is an enlarged elevational view of the strip wiping pads showing the details of adjustable means for relatively moving the pads.
Figure 7:
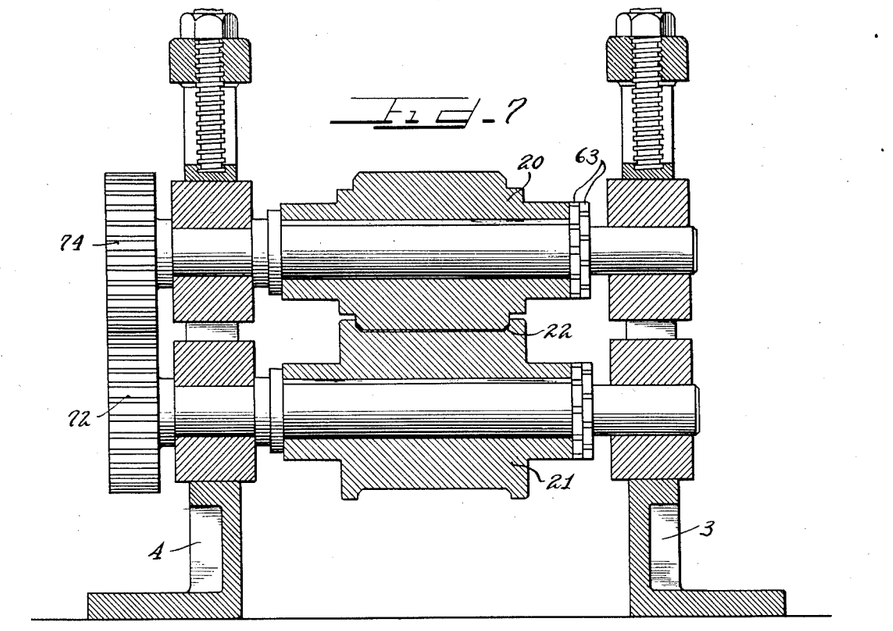
Figures 7 and 8 are enlarged vertical sections of the first two sets of rolls respectively, taken substantially on lines VII—VII and VIII—VIII of Figure 1.

Should it not be desirable during the forming of the strip to disconnect the first four sets of rolls from the power source, a modification of the clutch is illustrated in Figure 5 which includes a bracket or stirrup 79 which is secured to the drive member of the clutch by means of bolts 80. This bracket is of such shape that it will securely maintain the driven member of the clutch in clutched position with the drive member of the clutch at all times. Of course, with this arrangement the clutch shifting lever mechanism 78 may, if desired, be dispensed with.

The polishing mechanism C of the machine of this invention comprises a supporting pedestal 81 having a base portion 82 which supports one of a plurality of polishers, this polisher being substantially housed within the pedestal 81. Another polisher is supported at the top of the pedestal 81, and since these two polishers are substantially similar, it is thought that it will only be necessary to describe one of them.

Figure 15:
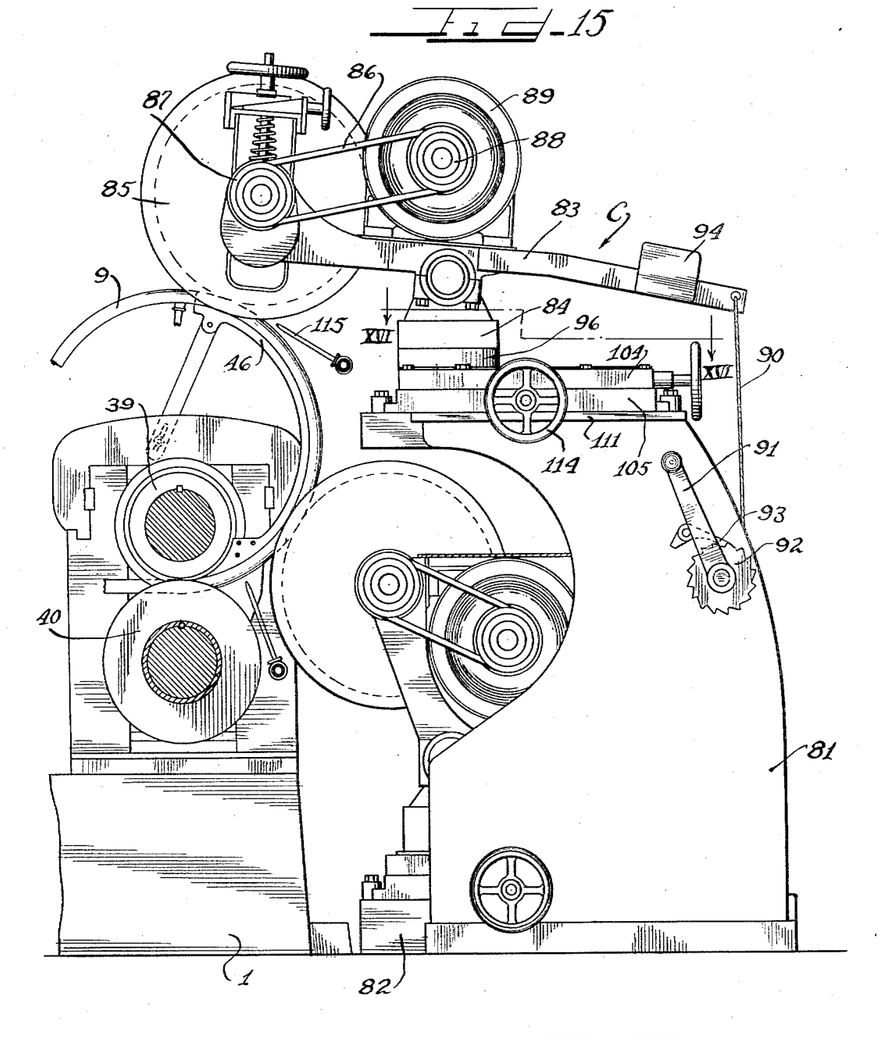
Figure 15 is an enlarged side elevation of the polishing portion of the machine, showing the polishing elements and their relation to the formed strip emerging from the last set of rolls.
Figure 16:
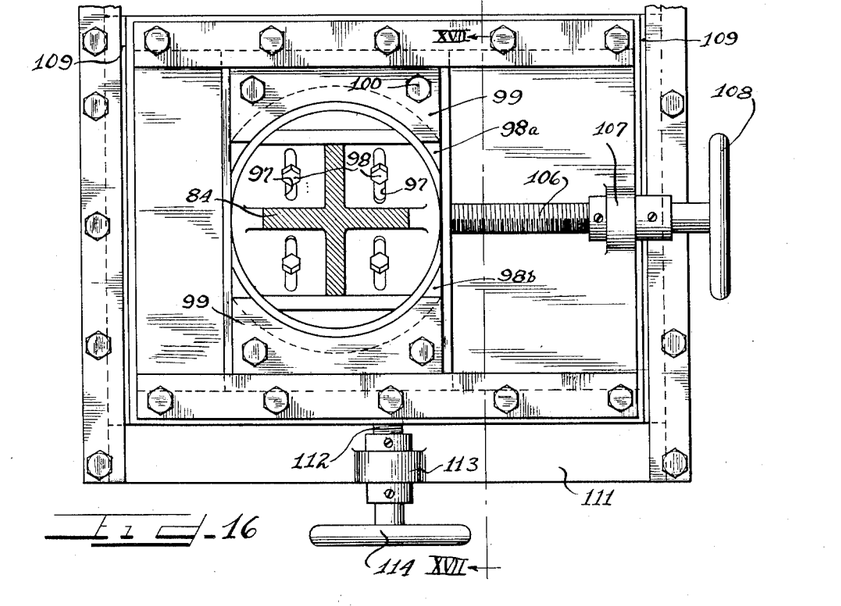
Figure 16 is an enlarged detail plan view of the adjustable carriage support for one of the polishing elements, taken substantially on line XVI—XVI of Figure 15.
Figure 17:
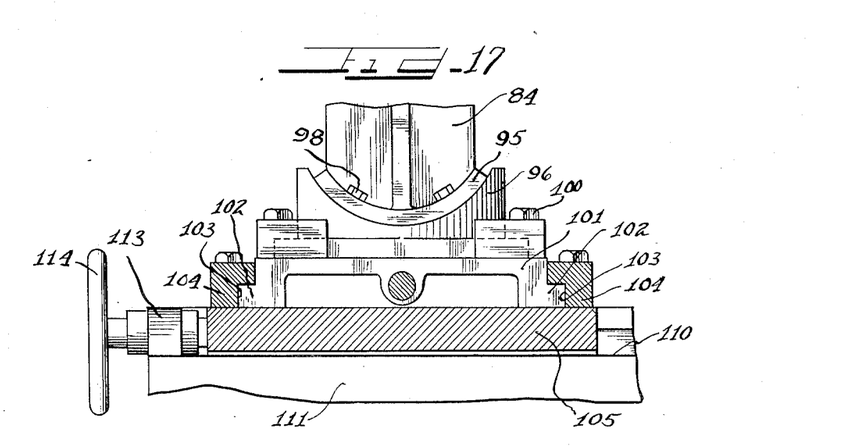
Figure 17 is an elevational view partly in section of the carriage support showing means for enabling angular adjustment of the polishing elements, taken substantially on line XVII—XVII of Figure 16.

Each polisher embraces an arm 83 which is pivoted between its ends to the upper end of a standard 84. One end of the arm 83 has mounted thereon a rotatable polishing wheel 85 which is driven by a belt 86 which is trained over a pulley 87 on the shaft of the polishing wheel and a pulley 88 on the drive shaft of a motor 89 which is secured to the arm 83 adjacent its pivot point. The pulleys 87 and 88 are preferably of the multi-step type which enables variation of the speed at which the polishing wheel is driven relative to the speed at which the motor is operating. The arm 83 may be rocked about its pivot point to bring the polishing wheel into engagement with the outer surface of the formed strip as it passes over the shoe 46 by means of a rope or cable 90 which is secured at the opposite end of the arm 83 from the end thereof carrying the polishing wheel. The other end of this rope or cable is carried to a windlass which may be actuated by means of a crank 91. Since the motor and the polishing wheel are so disposed that the center of gravity is on the left side of the pivot of the arm 83 as viewed in Figure 15, the normal tendency of the arm is to rotate anti-clockwise. In order to maintain the arm 83 in any desired position, the crank is provided with a toothed wheel 92 which is engaged by a latch member 93, the teeth on the wheel 92 and the latch member being so disposed that rotation of the crank in one direction may be prevented. A counterweight 94 is carried on the right end of the arm 83, whereby the arm may be rotated without exerting an excessive amount of energy.

It will be appreciated that since the formed strip is traveling over the shoe 46 in a spiral path, there are times when it may become necessary to dispose the polishing wheel 85 at an angle displaced from the vertical. In order to obtain this adjustment, the standard 84 is provided with a base 95 which is formed on the sector of a circle and is supported in a cradle 96 having a mating curved surface. The base 95 is slotted as shown at 97 for receiving therethrough bolts 98 which threadedly engage the cradle 96. By loosening the bolts 98 the standard 84 may be tilted relative to the cradle 96 and secured in the tilted position by again tightening the bolts 98.

The cradle 96 is provided at its lower end with oppositely disposed segmental flanges 98a and 98b, each of which is engaged by a clamping plate 99 which will tightly secure the cradle 96 against rotational movement when the clamping plate is tightened by means of clamping bolts 100 which threadedly engage a platform 101. This arrangement enables the cradle 96 to be rotated about its vertical axis and allows further adjustment of the polishing wheel relative to the strip. The platform 101 is provided with lateral flanges 102 which extend into longitudinally extending grooves 103 in guide members 104. The guide members 104 are secured to the upper surface of a second platform 105 and the platform 101 is slidable on the platform 105 by means of a screw 106 which is rotatably mounted in a lug 107 on the platform 105, a suitable hand wheel 108 being provided at the outer end of the screw for manually actuating the same. Rotation of the hand wheel 108 will therefore move the platform 101 in a horizontal plane. Movement of the carriage of the polisher in a direction at right angles to the movement of platform 101 is made possible by providing the end of this platform with suitable flanges 109 which are slidable in grooves 110 of a top plate 111 for the pedestal 81. The platform 105 is therefore movable in a horizontal plane in a direction at right angles to the direction in which platform 101 is movable. Adjustment of the platform 105 is accomplished in a manner similar to that of platform 101, this being by means of a screw 112 which is rotatably mounted in a lug 113 on the top plate, this screw being provided with a suitable hand wheel 114. It will therefore be apparent that the carriage for the polisher enables a universal adjustment thereof.

Polishing liquid is supplied to the strip adjacent where it is engaged by the polishing wheels 85 by means of a nozzle 115 which is connected to a suitable source of supply.

From the foregoing, it will be apparent that the strip or ribbon moves in a substantially straight line as far as the finishing rolls 39 and 40. Starting with a flat strip, the rolls 20 and 21 form slight flanges which are further bent by rolls 23 and 24 to substantially right angular relation to the body of the strip. The spinning wheels 26 cause the flanges to be bent still further toward the strip and the rolls 32 and 33 press these flanges against the strip proper and also curve the lateral margins of the strip, the central portion of the strip remaining flat. The rolls 36 and 37 additionally curve the strip transversely and the final rolls 39 and 40 stretch out the central portion to impart the longitudinal curvature to the strip so that it issues from the machine and is carried over the shoe 46 so as to form a helical coil. The finishing rolls 39 and 40 also burnish the strip and while the strip is passing over the shoe 46 the polishing wheels 85 polish the outer surface of the strip. The strip is then cut into predetermined lengths and the split rims are now in a finished condition, it being unnecessary to do anything further to the rim, unless it is desired to plate the same, in which case the rims are taken to the plating department.

Now, it is of course to be understood that although I have described in detail the preferred embodiment of my invention, the invention is not to be thus limited, but only insofar as defined by the scope and spirit of the appended claims.

I claim as my invention:

1. An apparatus for producing from a continuous ribbon of sheet metal of substantially uniform thickness, tire cover rims in the form of transversely arcuate split rings, said apparatus comprising means for bending said ribbon transversely and longitudinally, means for transversely cutting the bent ribbon into predetermined lengths, and means for imparting a finish to the surface of said ribbon prior to the cutting operation.

2. An apparatus for producing from a continuous ribbon of sheet metal of substantially uniform thickness, tire cover rims or the like in the form of transversely arcuate split rings, said apparatus comprising means for bending said ribbon transversely and longitudinally, means for transversely cutting the bent ribbon into predetermined lengths, and means for polishing the surface of said ribbon prior to the cutting operation.

3. An apparatus for producing from a continuous ribbon of sheet metal of substantially uniform thickness, tire cover rims or the like in the form of transversely arcuate rings, said apparatus comprising a plurality of cooperative members for imparting a predetermined transverse curvature to said ribbon, and means for longitudinally curving said strip and contemporaneously burnishing the same, whereby said ribbon upon emerging from said means will have a longitudinally curved shape having a burnished surface.

4. An apparatus for producing from a continuous ribbon of sheet metal of substantially uniform thickness, tire cover rims or the like in the form of transversely arcuate split rings, said apparatus comprising a plurality of cooperative members for imparting a predetermined transverse curvature to said ribbon, means for imparting a longitudinal curvature to said strip, shearing mechanism for cutting the longitudinally curved strip into predetermined lengths to form split rings, and means for burnishing and polishing the strip prior to the cutting operation.

5. An apparatus for producing from a continuous ribbon of sheet metal of substantially uniform thickness, tire cover rims or the like in the form of transversely arcuate rings, said apparatus comprising a plurality of cooperative members for imparting a predetermined transverse curvature to said ribbon, and means for longitudinally curving said strip and burnishing the same, whereby said ribbon upon emerging from said means will have a longitudinally curved shape having a burnished surface, said means including cooperative rolls having a surface speed different than the lineal speed of the ribbon.

6. An apparatus for producing from a continuous ribbon of sheet metal of substantially uniform thickness, tire cover rims in the form of transversely arcuate split rings, said apparatus comprising a plurality of cooperative members for imparting a predetermined transverse curvature to said ribbon, means for longitudinally curving said strip and burnishing the same, whereby said ribbon upon emerging from said means will have a longitudinally curved shape having a burnished surface, said means including cooperative rolls having a surface speed above the lineal speed of the ribbon.

7. An apparatus for producing from a continuous ribbon of sheet metal of substantially uniform thickness, tire cover rims in the form of transversely arcuate split rings, said apparatus comprising a plurality of cooperative members for imparting a predetermined transverse curvature to said ribbon, means for imparting a longitudinal curvature to said ribbon and contemporaneously burnishing the same, whereby said ribbon upon emerging from said means will have a longitudinally curved shape having a burnished surface, and means for removing foreign matter from said ribbon before and during its passage through the machine.

8. An apparatus for producing from a continuous ribbon of sheet metal of substantially uniform thickness, tire cover rims in the form of transversely arcuate split rings, said apparatus comprising a plurality of cooperative members for imparting a predetermined transverse curvature to said ribbon, means for longitudinally curving said ribbon and burnishing the same, whereby said ribbon upon emerging from said means will have a longitudinally curved shape having a burnished surface, and means for removing foreign matter from said ribbon before and during its passage through the machine, said latter means including a pad in wiping engagement with the ribbon.

9. An apparatus for producing from a continuous ribbon of sheet metal of substantially uniform thickness, tire cover rims in the form of transversely arcuate split rings, said apparatus comprising a plurality of cooperative members for imparting a predetermined transverse curvature to said ribbon, means for curving said ribbon longitudinally and burnishing the same, whereby said ribbon upon emerging from said means will have a longitudinally curved shape having a burnished surface, and means for removing foreign matter from said ribbon before and during its passage through the machine, said latter means including a pad in wiping engagement with said strip and nozzles adapted to direct a fluid on said ribbon.

10. An apparatus for producing from a continuous ribbon of sheet metal of substantially uniform thickness, tire cover rims in the form of transversely arcuate split rings, said apparatus comprising a plurality of forming rolls for imparting a predetermined transverse curvature to said ribbon, finishing rolls for imparting a longitudinal curvature to said ribbon and to burnish the ribbon, and means for removing foreign matter from said ribbon before and during its passage through the machine, said means including a pad in wiping engagement with said ribbon and nozzles adapted to direct a liquid onto said ribbon and between said rolls.

11. An apparatus for producing from a continuous strip of sheet metal of substantially uniform thickness, tire cover rims in the form of transversely arcuate split rings, said apparatus comprising means for bending said strip transversely and longitudinally, and a shoe shaped to form a sector of a helix for guiding the strip away from said means, and a polishing member for finishing the outer surface of the strip as it passes over said shoe.

12. An apparatus for producing from a continuous strip of sheet metal of substantially uniform thickness, tire cover rims in the form of transversely arcuate split rings, said apparatus comprising means for bending said strip transversely and longitudinally, a shoe shaped to form a sector of a helix for guiding the strip away from said means, a polishing member for finishing the outer surface of the strip as it passes over said shoe, and means for cooling said shoe.

13. An apparatus for producing from a continuous ribbon of sheet metal of substantially uniform thickness, tire cover rims in the form of transversely arcuate split rings, said apparatus comprising means for bending said strip transversely and longitudinally, a hollow shoe shaped to form a sector of a helix for guiding the strip away from said means, connections to said shoe to enable the circulation of a cooling liquid therethrough, and a polishing member disposed so as to impart a finish to the outer surface of the strip as it passes over the shoe.

14. In a machine for producing finished tire cover rims from a substantially flat strip of material, polishing means including a rotatable polishing wheel adapted to engage the outer surface of said strip, and a universally adjustable mounting for said means to enable adjustment of the wheel relative to the strip.

15. In a machine for producing finished tire cover rims from a substantially flat strip of material, polishing means including a rotatable polishing wheel adapted to engage the outer surface of said strip, and a universally adjustable mounting for said means to enable adjustment of the wheel relative to the strip, said mounting comprising a rotatable and tiltable standard, and means for bodily shifting said standard laterally in directions at right angles to each other.

16. The method of forming a finished tire cover rim which consists in the forming of a flat strip into a transversely and longitudinally curved strip, finishing the surface of said strip after it is transversely and longitudinally curved, and shearing said finished strip to form split rings of predetermined length.

17. The method of forming a finished tire cover rim which consists in rolling a flat strip into a transversely curved form, longitudinally curving said rolled strip, guiding the strip into a spiral, finishing the strip while in spiral form, and shearing the finished spiral strip into rings of predetermined length.

18. The method of forming a finished tire cover rim which consists in rolling a flat strip into a transversely and longitudinally curved form, applying a fluid to said strip during the rolling thereof, conducting the rolled strip so as to form it into a spiral, polishing said strip during its formation into a spiral, and shearing the finished strip into rings of predetermined length.

19. The continuous process of producing finished tire cover rims or the like which consists in progressively forming a moving flat strip into a transversely and longitudinally curved spiral, polishing said strip during said forming operation, and shearing said spirally wound strip to form split rings of predetermined lengths.

20. The continuous process of producing finished tire cover rims or the like which consists in progressively forming a moving flat strip into a transversely and longitudinally curved spiral, and burnishing and polishing said strip during its formation into a spiral.

GEORGE ALBERT LYON.